(12) United States Patent
Hundal et al.

(10) Patent No.: US 7,693,516 B2
(45) Date of Patent: Apr. 6, 2010

(54) METHOD AND SYSTEM FOR ENHANCED COMMUNICATIONS BETWEEN A WIRELESS TERMINAL AND ACCESS POINT

(75) Inventors: Sukhdeep S. Hundal, Delta (CA); Che Hung Wong, Vancouver (CA); Peter Wai-Tong Kwong, Vancouver (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 402 days.

(21) Appl. No.: 11/316,824

(22) Filed: Dec. 27, 2005

(65) Prior Publication Data
US 2006/0209773 A1 Sep. 21, 2006

Related U.S. Application Data

(60) Provisional application No. 60/639,303, filed on Dec. 28, 2004.

(51) Int. Cl.
*H04Q 7/20* (2006.01)
(52) U.S. Cl. .................. 455/435.1; 455/411; 455/41.2; 455/422.1; 370/338
(58) Field of Classification Search ................. 455/455, 455/552.1, 450, 422.1, 41.2, 411, 435.1; 370/338
See application file for complete search history.

(56) References Cited

U.S. PATENT DOCUMENTS

| | | | |
|---|---|---|---|
| 6,766,160 B1 * | 7/2004 | Lemilainen et al. | 455/411 |
| 2002/0029252 A1 * | 3/2002 | Segan et al. | 709/217 |
| 2004/0100910 A1 * | 5/2004 | Desai et al. | 370/238 |
| 2005/0266826 A1 * | 12/2005 | Vlad | 455/410 |
| 2006/0019646 A1 * | 1/2006 | Benco et al. | 455/419 |
| 2006/0068799 A1 * | 3/2006 | Morton et al. | 455/450 |

* cited by examiner

*Primary Examiner*—Vincent P Harper
*Assistant Examiner*—Fred A Casca
(74) *Attorney, Agent, or Firm*—Paul, Hastings, Janofsky & Walker LLP

(57) ABSTRACT

A system and method for enhancing communications between a WiFi terminal and other devices coupled to a wireless network. A wireless Access Point is configured to receive data from a data network through a wired link and to transmit and receive data over an 802.11 wireless link to one or more wireless devices. The wireless Access Point also includes a preset communications profile. A set of IP addresses and capability set information associated with devices of the wireless network is provided. Accordingly, a WiFi terminal WiFi terminal can automatically establish a link capable of data exchange with the wireless Access Point by simply powering up the WiFi terminal. In one embodiment, IP address and capability set information is automatically exchanged between the WiFi terminal and other compatible devices of the wireless network.

14 Claims, 13 Drawing Sheets

| Profile Name | SSID | ENCRYPTION | PASSWORD |
|---|---|---|---|
| HOME | HOMENET | 1234XYZ | 22221111 |

302A

METHOD AND SYSTEM FOR ENHANCED COMMUNICATIONS BETWEEN A WIRELESS TERMINAL AND ACCESS POINT

This Application claims priority to U.S. Provisional Application No. 60/639,303 entitled Method and System for Improved Access to Wireless Communications, filed Dec. 28, 2004.

BACKGROUND

1. Field of the Invention

The present invention relates generally to wireless communications systems. More particularly, the present invention relates to systems for improved WiFi access using a wireless device.

2. Background of the Invention

The proliferation of wireless devices provides users opportunities for more convenient, effective and enjoyable communications. For example, wireless terminal devices used in the home and office environment such as cordless telephones and wireless devices employing 802.11 communications standards (also termed "WiFi" devices, hereinafter), allow a user to use and carry the wireless terminal device during use anywhere within a communications range of an access unit that is used to transmit and receive signals to and from the wireless device. For example, handsets of cordless telephone systems can typically be operated effectively within about 10 to 100 meters of a base station. A user of a WiFi terminal device, such as a personal digital assistant, can likewise employ the device within a similar range of a WiFi Access Point, a wireless router, for example.

One advantage of cordless telephone systems is that setup and use of the cordless system is simple. Installation of a new cordless phone system typically involves simply plugging a base station into a power source and landline telephone connection. Typically, a user can subsequently operate the cordless handset to place or receive a telephone call by simply pressing a single button, such as a "talk" or "on" button.

WiFi devices are designed to communicate using an 802.11 standard which employs a fixed frequency band spanning frequencies around 2.4 GHz, similar to frequencies employed by many cordless telephones. Accordingly, in typical circumstances a user can employ a WiFi terminal such as a personal digital assistant (PDA) within a similar range of communications of an Access Point, as is found for cordless telephone handsets. WiFi terminal devices allow a user to send and receive digital data, such as text messages and digital voice information, by communicating with the Access Point, which is in turn linked to a data network or other network designed for transmitting digital information.

However, in a typical circumstance, a user of a WiFi terminal device (hereinafter also referred to as "WiFi handset" or "terminal device") employs a series of steps in order to link to the Access Point to receive and transmit data. FIG. 1 illustrates steps employed for a user of a known WiFi terminal device to link to an Access Point (also termed "AP", "wireless access point", or "wireless AP" herein). In step 100, when a WiFi handset is powered on, the WiFi handset searches for any 802.11 networks or service sets that are present within the vicinity of the WiFi handset. For example, any Access point in a WiFi wireless network, such as a local area network (LAN), includes a service set identifier (SSID) that identifies the Access Point. A home LAN may have one or more Access Points, which typically are set to have the same SSID. When a user powers on a WiFi handset near an access point of the home LAN, an SSID identifying the handset is sent to the wireless device.

In step 102, a list of any available networks is provided to the user on the handset. SSIDs associated with the user's "home" network and also those belonging to additional wireless networks in the vicinity may be detected and displayed on the WiFi handset.

In step 104, the user then selects the SSID of the network that is to be joined.

In some systems, as indicated in step 106, a user must enter a password before the user can join a network having the selected SSID.

In order to reduce the length of this process, a user could enter information into the WiFi handset that causes the device to look for a specific SSID to link to upon power up, thus avoiding the need to specify the SSID to be linked to each time the device is powered on. However, the user is still required to set up the automatic SSID searching procedure at least once.

In step 108, an authentication process is initiated. In order for data to be transmitted in a secure manner between the wireless Access Point and the WiFi handset, an encryption protocol is typically employed. Authentication may be based on a shared key, for example, a Wireless Equivalent Privacy (WEP) encryption key.

If authentication is successful, in step 110, the wireless terminal links to the wireless network at the Access Point.

In step 112, if a system other than WEP is used, a user supplies a predetermined encryption key, which is sent to the Access Point, after which, in step 114, the WiFi terminal and Access Point are associated and data exchange can take place.

In light of the foregoing, it will be apparent that a need exist to improve the ease of use of WiFi terminal devices.

SUMMARY OF THE INVENTION

In one embodiment of the present invention, a system for improved wireless access for a WiFi terminal includes a wireless Access Point configured to receive data from a data network through a wired link. The wired link can include a digital subscriber line connection, a data connection from a cable modem, a high speed connection to a local area network, connection to a PSTN phone line, or other connection. The Access point further includes a radio transceiver configured to transmit and receive data over a wireless link to one or more wireless devices. Preferably, the wireless link is an 802.11 link. The wireless Access point also includes a non-volatile memory that contains a preset communications profile (also termed "network profile" hereinafter). Preferably, the communications profile includes a preset authentication routine, an encryption algorithm, and a predetermined SSID to be used to communicate with other 802.11 devices. A set of WiFi terminals are provided that each can be a PDA, a wireless device configured to receive voice data, a wireless laptop computer, or other hybrid communications/computing device. Each WiFi terminal further includes a non-volatile memory that contains a preset communications profile substantially the same as that contained in the wireless Access Point (AP). Included in the communications profile of the WiFi terminal is the predetermined SSID of the wireless AP, as well as the predetermined authentication routine, and encryption algorithm that are contained in the network profile stored in the AP. Accordingly, after a unit containing the system of the present invention is installed, a user of one of the WiFi terminals can automatically establish a link capable of data exchange with the wireless AP by simply powering up the WiFi terminal. After power up, choosing the appropriate SSID, authentication between handset and AP, and encryption are accomplished without further user intervention, greatly streamlining the ability to access data networks using the WiFi device.

In another embodiment of the present invention, a method for improved access to a WiFi source includes a step of installing a common communications profile in a first wireless AP to be used with a first WiFi terminal for data exchange. Preferably, the communications profile includes a predetermined SSID, a preset authentication routine, and an encryption algorithm. In another step, the common communications profile is installed in the first WiFi terminal. The first WiFi terminal is powered on. The first WiFi terminal initiates a search for a wireless network having the predetermined SSID. A network associated with the predetermined SSID is located. An authentication routine is initiated between the first WiFi terminal and the first AP. In a subsequent step, the first WiFi terminal and first AP are automatically associated. Accordingly, a user of the first WiFi terminal is enabled to link to and receive data from the first wireless AP by simply powering on the WiFi terminal.

In a further embodiment of the present invention, a method for enhancing communications in a wireless network comprises a step of associating a first WiFi terminal to a wireless AP. In a second step, the first WiFi terminal broadcasts a handset IP address associated with the first WiFi terminal. The IP address can be a fixed IP address or can be a dynamic IP address that is assigned by a DHCP server connected to the wireless AP. In one embodiment of the present invention, the handset IP address is received after a request for IP address sent in a broadcast message from the WiFi terminal. In a further step, compatible devices connected to the AP receive the broadcast IP message from the first WiFi terminal. Only devices compatible with the first WiFi terminal decode the IP message. In a further step, the first WiFi terminal receives from one or more compatible devices a message that includes the IP address associated with that compatible device. In a further step, the capability set of the first WiFi terminal is sent in a broadcast message. The capability set broadcast is received by the other compatible devices. In an additional step, the first WiFi terminal receives a message from one or more of the other compatible devices as to the capability set of the compatible device. Accordingly, a new wireless handset can be conveniently linked to other devices connected to a common AP, and communications between such devices facilitated through sharing of common capabilities.

DETAILED DESCRIPTION OF PREFERRED EMBODIMENTS

Figure 1:
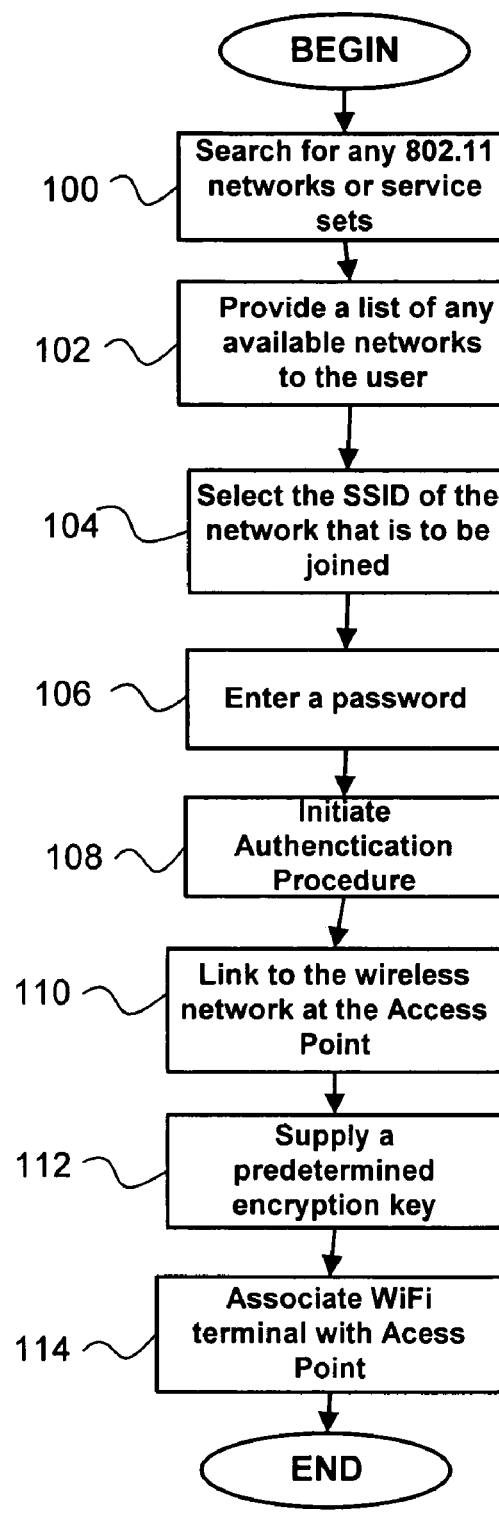
FIG. 1 illustrates a known method for establishing a link between a WiFi terminal and an AP.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

Figure 2:
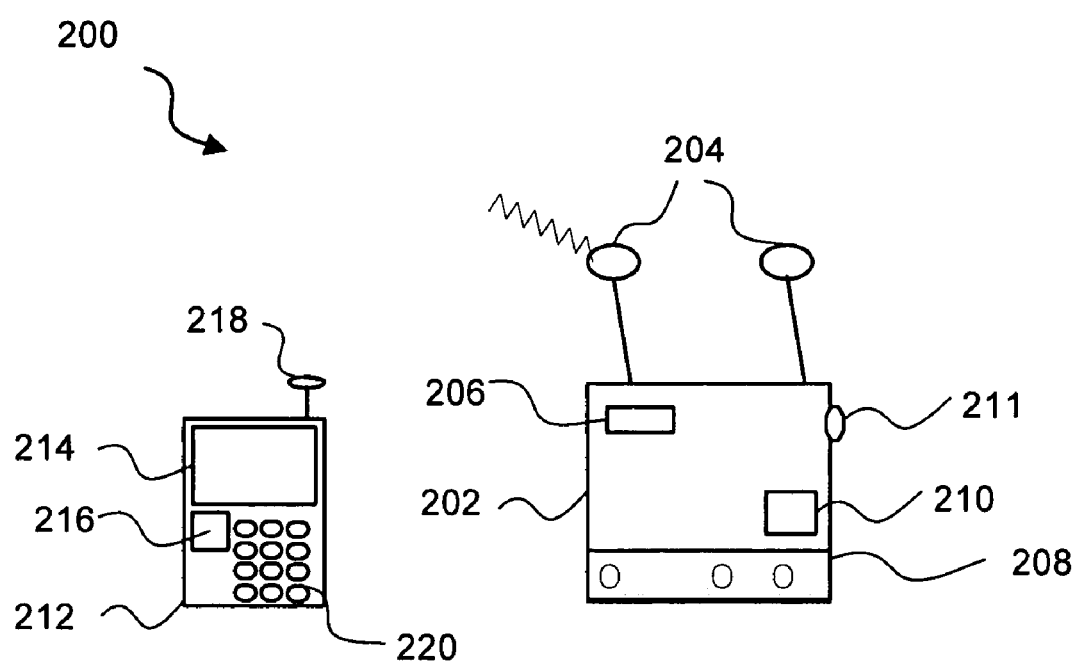
FIG. 2 depicts basic features of a WiFi system according to one embodiment of the present invention.

FIG. 2 illustrates a system 200 that provides enhanced access between a WiFi terminal and AP according to one embodiment of the present invention. System 200 includes AP 202, which preferably employs an 802.11 wireless communications standard (also hereinafter termed "protocol"). As is well known, 802.11 protocol refers to a family of IEEE standards for WLAN, such as 802.11b, 802.11a, 802.11g, etc. In exemplary embodiments, AP 202 can be configured to operate on at least one of the 802.11 standards. Additionally, in other embodiments, AP 202 is configured to operate on known IEEE protocols. AP 202 and WiFi terminal 212 communicates with each other using, among other components, radio transceiver 206 and antennas 204 and 218. An LED console is provided to indicate to a user the status of communication links and other information. Non-volatile memory 210 is provided to store information such as network profile information. Preferably, the network profile information contains a standard network profile associated with AP 202 as described further below. Port 211 provides a wired connection to link to a data network. For example, connection 211 can be an RJ45 connector configured to connect to a data network.

WiFi terminal (or "handset") 212 can be a PDA, Voice over Internet Protocol (VOIP) enabled phone, wireless laptop device, or other hybrid communications/computing device. Accordingly, the term "handset" as used herein, will refer to a range of wireless capable devices whose portability and size may vary substantially. WiFi terminal 212 is provided with display 214 to allow reception of data to enable, for example, instant messaging, short message service (SMS), or web surfing. In one embodiment, terminal 212 further includes hardware (not shown) that provides for full telephony functionality, so that terminal 212 can be used to conducting a telephone conversation using a data network linked to AP 202. In other embodiments, terminal 212 includes known hardware and software that provides for full video streaming. Included in terminal 212 is non-volatile memory 216 that can store network profile information to be used to communicate with wireless APs. Preferably, non-volatile memory 216 contains network profile information found in a network profile that is stored in non-volatile memory 206 of AP 202. In one embodiment, WiFi handset 212 and AP 202 belong to a same commercial WiFi system in which the standard network profile is preset in both handset 212 and AP 202 during manufacture. Accordingly, when a user sets up wireless system 200, AP 202 is connected to a wired data link and powered on. A user wishing to use terminal 212 simply powers on the terminal and the system automatically associates terminal 212 with AP 202.

Automatic association of terminal 212 with the network (not shown) containing AP 202 is facilitated by the common network profile information stored in memory 210 and memory 216. Preferably, the common network profile information includes a communications profile that contains a predetermined SSID to be used by AP 202, a preset authentication routine, and an encryption algorithm. Accordingly, after powering on, terminal 212 searches for the network of AP 202 based on the predetermined SSID stored in memory 216. Authentication and security screening is likewise accomplished using the stored authentication routine and encryption algorithm. User interface 220 is used to program, operate, or otherwise manipulate terminal 212. User interface can be used, for example, to send, receive, or display information to the user on display 220. Exemplary user interface 220 can include, for example, one or more of a keypad, a pointing device, a touch pad, and a stylus.

In another embodiment of the present invention, terminal 212 of system 200 is configured to store standard network profile information associated with a plurality of networks. Preferably, the standard network profile information includes communications (network) profiles that are stored in non-volatile memory 216.

Figures 3, 3A:
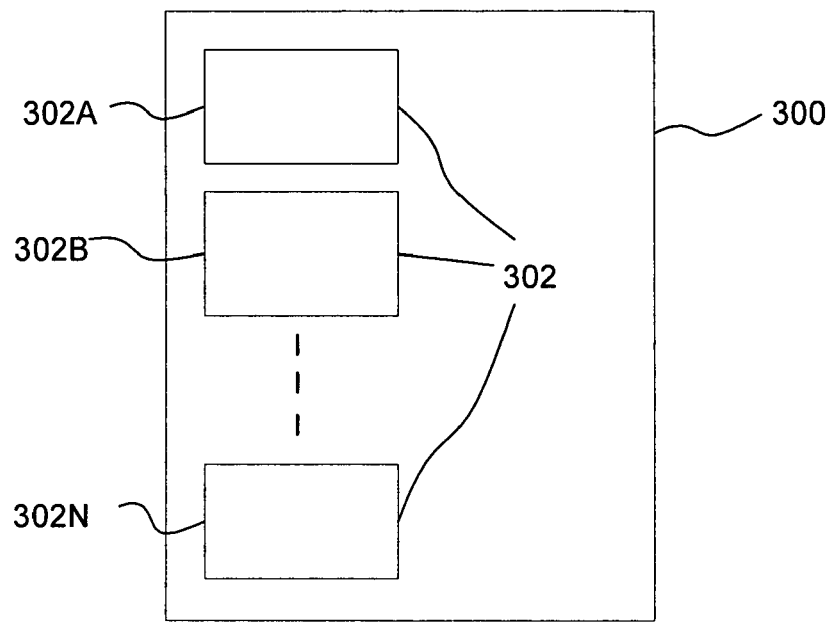
FIG. 3 depicts a database containing a plurality of network profiles, according to another embodiment of the present invention.
FIG. 3A illustrates details of one network profile of the database of FIG. 3.

FIG. 3 illustrates a database 300 that contains a plurality of network profiles according to one embodiment of the present invention. Database 300 can reside in a "network settings" data structure (not shown) that is stored in memory 216, for example. Database 300 contains a plurality of wireless network communications profiles that are associated with a WiFi terminal, for example terminal 212. Included in the wireless network communications profiles are home profile 302A, primary work profile 302B, and hotspot profile 302N. In addition, database 300 can contain any number of additional predetermined communications profiles, for example, secondary work profiles. Each AP communication profile is configured to provide access for terminal 212 to a respective wireless network having a like communications profile. Preferably, each of the wireless network communications profile contains a predetermined SSID, a preset authentication routine, and an encryption algorithm that are unique to a respective network. In one embodiment, upon power up of terminal 212, a user is provided with a selection of network profiles from which to choose. A user can select a wireless network profile based on a network that the user wants to link to terminal 212. For example, in one embodiment, terminal 212 contains home profile 302A, depicted in detail in FIG. 3A, that is associated with a network containing AP 202 used at home. A user at home selects home profile 302A from table 300, and is subsequently automatically linked to the home network through AP 202.

A user at work or visiting a location of a commercial "hotspot" can likewise select wireless network profile 302B or 302N, respectively, to link to an AP associated with a respective work or hotspot network. In the case of a hotspot network, the network operator can, for example, provide hotspot network profile 302N to the user, so that it can be preloaded into database 302.

Figure 4:
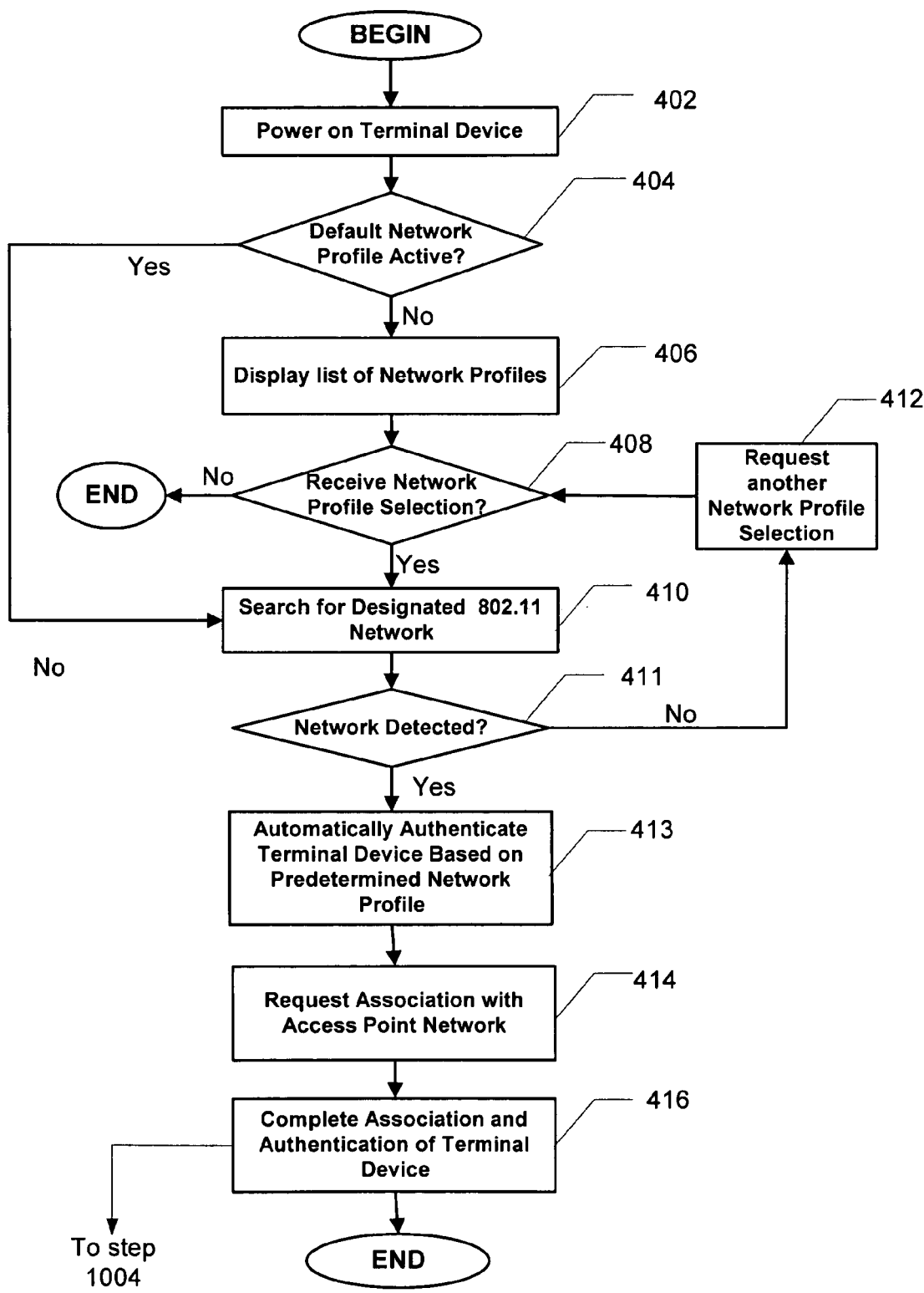
FIG. 4 illustrates exemplary steps involved in a method for improving access to a WiFi AP, according to an exemplary embodiment of the present invention.

FIG. 4 illustrates exemplary steps involved in a method for improved access to a WiFi source, according to one embodiment of the present invention. In step 402, the WiFi device is powered on. Upon power on, a series of predetermined operations is performed by the WiFi device.

In step 404, the WiFi device determines whether a default network communications profile is active. For example, a default network communications profile can be factory-installed in a wireless terminal device or set of wireless terminal devices. In addition to a factory-installed communications profile, a user may select other profiles to store in the WiFi device. Preferably, each of the communications profiles includes a predetermined SSID, a preset authentication routine, and an encryption algorithm that are unique to a respective network containing one or more APs. A technician or user could install additional profiles besides a factory-installed profile in a "network settings" data structure that is provided in the WiFi device. For example, with reference to FIG. 2, using a keypad 220 and display 214, a user can access an interface that allows network settings to be entered, altered, and deleted from device 212. Thus, a single WiFi device can have a plurality of network communications profiles installed, where each network communications profile (or "network profile") is associated with a different network as illustrated above in reference to FIGS. 3 and 3A.

In addition to storing a series of network communications profiles associated with different WiFi networks, one of the profiles can be actively selected as a default profile. For example, referring again to FIG. 3, a user or a factory installation process may have selected home profile 302A as a default network profile. If, in step 404, a default network profile is determined to be active, then the process moves to step 410. If no default network profile is indicated, then the process moves to step 406.

In step 406, a list of network profiles is provided. For example, display 214 provides list 302 from which a user can choose an individual profile.

In step 408, if a selection of a network profile from the user is received, the process moves to step 410.

In step 410, the WiFi device searches for the 802.11 network designated by a user in step 408 or by default setting in step 404. For example, if a user has selected profile 302A in step 408, the WiFi device attempts to detect a network AP, for example AP 202 of the home network system 200.

In step 411, if the designated 802.11 network, for example, AP 202, is successfully detected, the process moves to step 413. If the WiFi device fails so detect the designated 802.11 network, the process moves to step 412, where the user is asked to supply another network profile. For example, when a user powering up a WiFi terminal at work that has the default network profile active and designating profile 302A, the home 802.11 network designated by profile 302A will fail to be detected. The process moves to step 408 where the user can then supply a new network profile, for example, work profile 302B.

In step 413, automatic authentication procedures are conducted based on the network profile used by the WiFi terminal, as described above.

In step 414, the WiFi terminal requests association with the network containing the designated network profile.

In step 416, association of the WiFi terminal and authentication is completed.

Encryption information may be exchanged, as well as further levels of security as described below.

Information from a given network communications profile stored in the WiFi terminal device may also be stored in an appropriate AP, as described above with reference to FIG. 2. For example, an AP and WiFi terminal purchased as part of the same system may have a core network communications profile stored in both devices that includes SSID, encryption, and other authentication routines. As used herein the term "core network communications profile (or "core network profile" or "core network profile setting") includes information that can be used to establish wireless communications between an AP of a given wireless communications network and any of a plurality of WiFi devices that may be part of the wireless communications network. Such information can include SSID, encryption, and authentication information.

Figure 5:
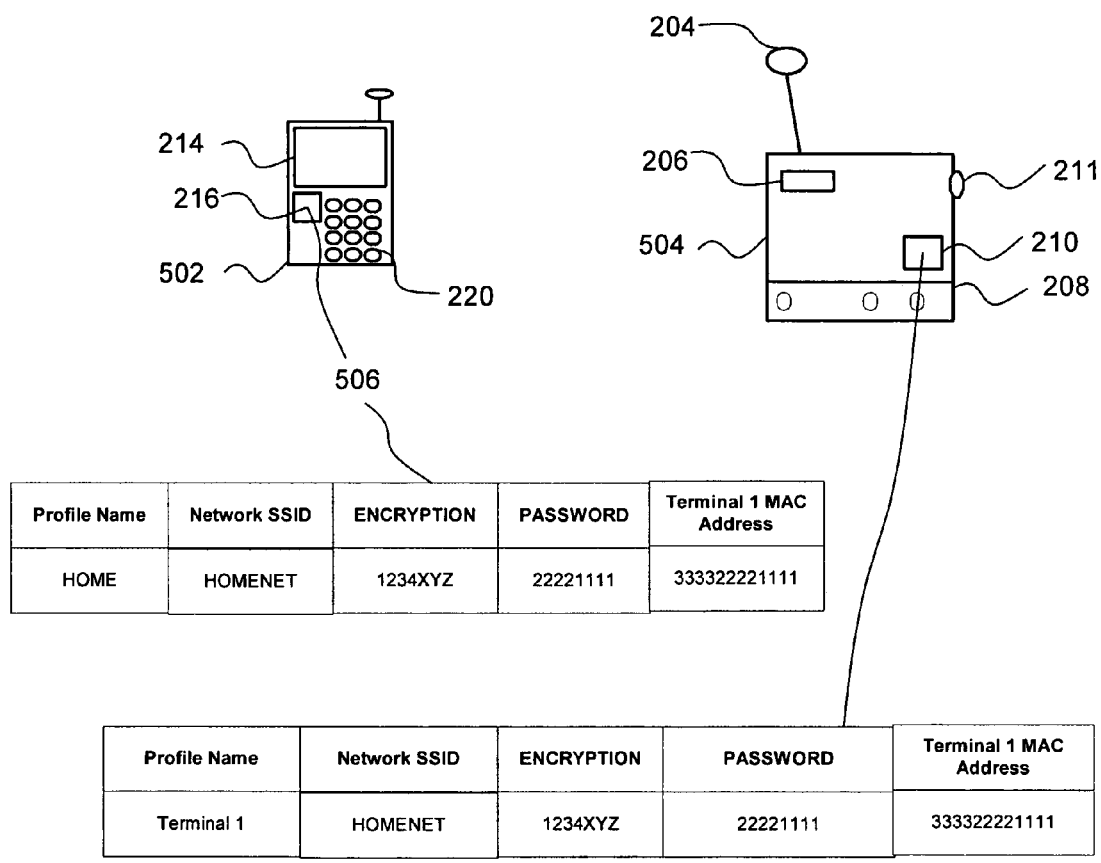
FIG. 5 depicts details of a WiFi system, according to another embodiment of the present invention.

In an exemplary embodiment of the present invention, the communications profile information of an AP of an 802.11 network further includes media access control (MAC) information that uniquely identifies one or more WiFi terminals. As is well known, each 802.11 device is configured with a MAC address unique to the device. Accordingly, a MAC address can be used to identify a WiFi terminal by an AP establishing a link to the terminal. FIG. 5 illustrates a system 500 that includes WiFi terminal 502 and AP 504, configured in accordance with another embodiment of the present invention. "Home" profile 506 represents an exemplary network communications profile that is stored in memory 216 of WiFi terminal 502. The profile name "home" indicates to WiFi terminal 502 that the profile corresponds to the wireless network containing home AP 504. "Terminal1" profile 508 represents a terminal communications profile (or "terminal profile") that is stored in memory 210 of AP 504. Terminal communications profile 508 indicates to AP 504 that the profile is associated specifically with WiFi terminal 502 (designated in the profile as "terminal1") and includes the MAC address of WiFi terminal 502. Terminal communications profile 508 can be used to support a MAC address filtering operation, such that profile information exchanged when terminal 502 attempts to access AP 504, causes terminal 502 to be recognized as a terminal with which AP 504 can associate. Accordingly, if other unauthorized users obtain the information the network SSID, password, and encryption information stored in home profile 506, access to AP 504 can be prevented. AP 504 detects that the WiFi terminal attempting to gain access does not contain the unique MAC address of terminal 502 that is stored in terminal1 profile 508. It therefore determines that the WiFi terminal is unauthorized to establish a link and halts the connection process.

Figure 6:
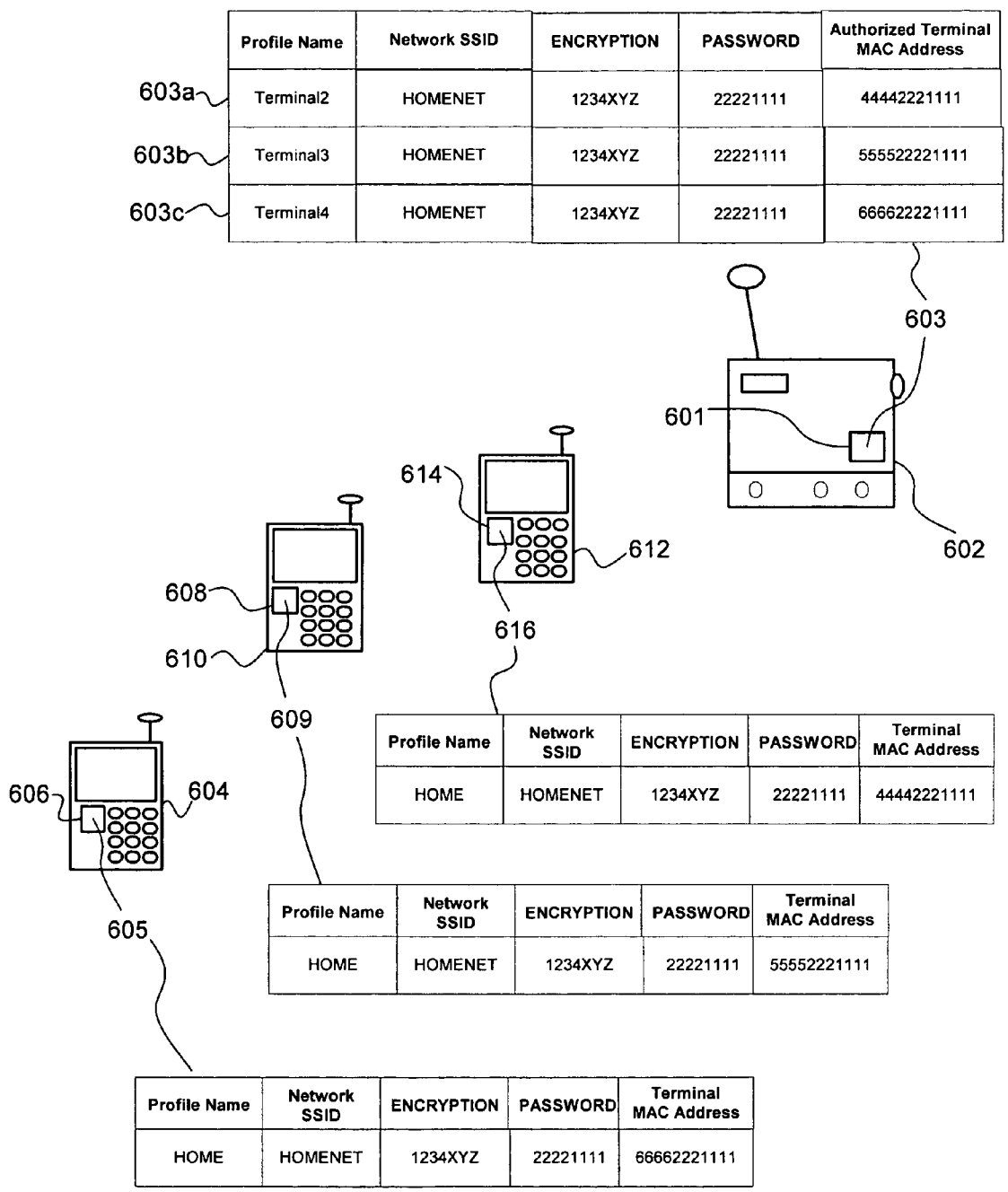
FIG. 6 depicts details of a WiFi system, according to a further embodiment of the present invention.

In another embodiment of the present invention illustrated in FIG. 6, an AP 602 is configured to communicate with a plurality of WiFi terminals 604, 610, 612. Table 603 includes terminal communications profiles 603a, 603b, 603c, corresponding to profiles to be used to communicate with WiFi terminals 612, 610, and 604, respectively. Each profile lists a MAC address corresponding to that of the respective WiFi terminal, which indicates to AP 602 that a WiFi terminal having the MAC address listed and attempting to associate with AP 602 is authorized to do so. Network profiles 605, 609, and 616, contained in WiFi terminals 604, 610, and 612, respectively, correspond to the respective network profiles 603c, 603b, and 603a of AP 602. Accordingly, any of WiFi terminals 604, 610, 612 are configured to automatically access AP 602 when powering on, using the common profile information including network SSID, encryption, and password that is stored in each network profile of the respective WiFi terminal. When each WiFi terminal attempts to associate with the AP 602 WiFi network (not shown), AP 602 additionally checks to determine the MAC address of the WiFi terminal in question. It then compares the address of the associating WiFi terminal with authorized addresses stored in profile 603, and upon finding a match, completes the association process. Other WiFi terminals having MAC addresses not stored in profile 603 are not permitted access to the WiFi network.

Figure 7:
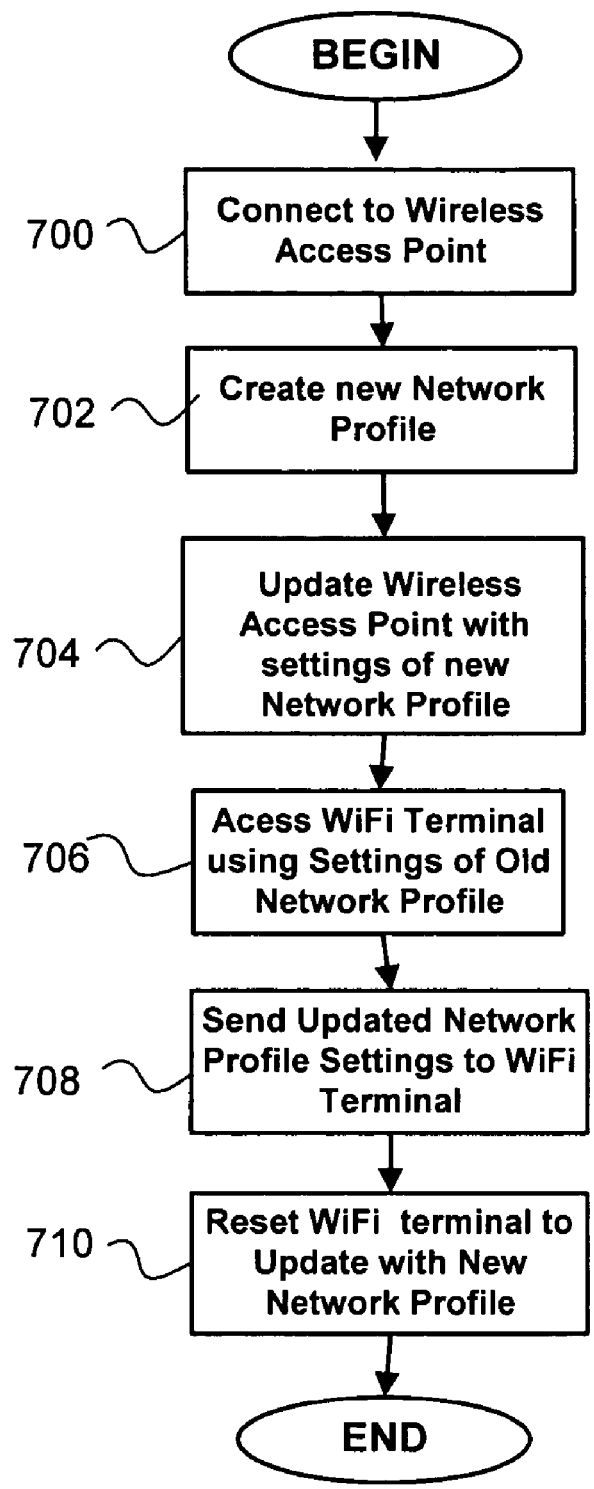
FIG. 7 illustrates exemplary steps involved in a process for updating network profile settings in an 802.11 network, according to another embodiment of the present invention.

FIG. 7 illustrates exemplary steps involved in a process for updating network profile settings in an 802.11 network, according to another embodiment of the present invention. For a variety of reasons, a user may wish to update network profile information in an AP and WiFi terminal, for example. If a user suspects that the network profile information of an AP in the 802.11 network is known to unauthorized persons, or if profile information is to be changed at regular intervals as part of a security protocol, the user decides to update the network profile settings.

Figure 8:
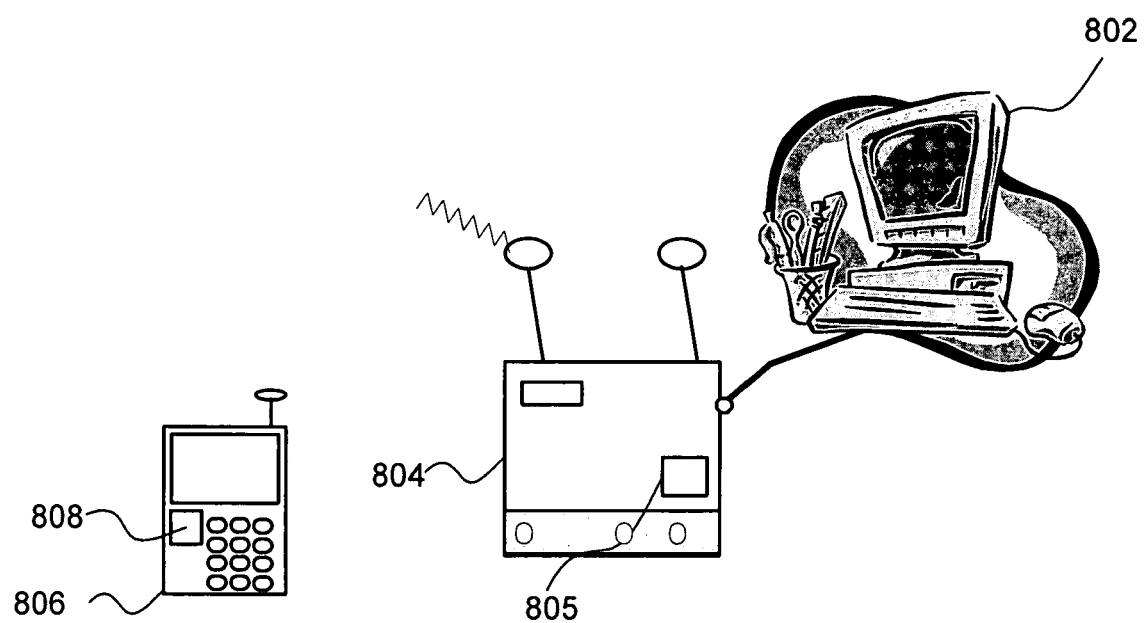
FIG. 8 illustrates an arrangement of a computer and WiFi system according to another embodiment of the present invention.

In step 700, the user accesses the core network profile settings of the AP of the 802.11 network. It is to be noted that the core network profile does not necessarily include any WiFi terminal-specific information that would identify a particular WiFi terminal. Thus, updating of the core network profile will serve to update common information used by a wireless network AP to associate with any WiFi devices of the wireless network. Preferably, the user connects to a Web page of the AP of the 802.11 network. As is known, APs such as routers typically have built in servers that provide web page access to a user wishing to interrogate or change features in the AP. FIG. 8 illustrates an arrangement according to one embodiment of the present invention in which a computer 802 is hardwire connected to AP 804. The user accesses settings and information about AP 804 through an AP 804 web page displayed on computer 802.

In step 702, the user changes settings such as core network profile information, for example, by entering these changes in fields supplied in the appropriate web page of AP 804. After changing a set of old core network profile settings, information containing the new core network profile settings is stored in the AP, for example AP 804. This updated information can then be forwarded to an appropriate WiFi terminal used to communicate with the AP. Preferably, the updated core network profile information includes the following network settings: a predetermined SSID, a preset authentication routine, and an encryption algorithm. The updated core network profile information can include changes to each of the network settings listed above or to only select network settings.

In step 706, the appropriate WiFi terminal to be sent the updated network profile information is accessed. In a preferred embodiment, the WiFi terminal is accessed over a wireless 802.11 link. Preferably, the AP attempts to establish a wireless link with the WiFi terminal using the old set of core network profile settings that are saved in the AP and also stored in the WiFi terminal.

Referring also to FIG. 8, in an exemplary embodiment, WiFi terminal 806 is part of a bundled system including AP 804, wherein an IP address of WiFi terminal 806 is automatically known to AP 804. Accordingly, WiFi terminal 806 and AP 804 are associated using old network settings stored in memory 808 and still saved in memory 805 of AP 804. A user at computer 802 can then automatically access a web page or internet address of WiFi terminal 806 because its IP address is known to AP 804. In other embodiments, a user can determine the IP address of the WiFi terminal and use this information to access the WiFi terminal to update the network profile settings.

In step 708, the updated core network profile information in sent to the WiFi terminal. Preferably, the updated information is sent over an 802.11 link. In the example of FIG. 8, WiFi terminal 806 receives the updated core network profile information from AP 804 after the updated information is entered in fields of a web page displayed by computer 802, as illustrated further in FIG. 9.

Figure 9:
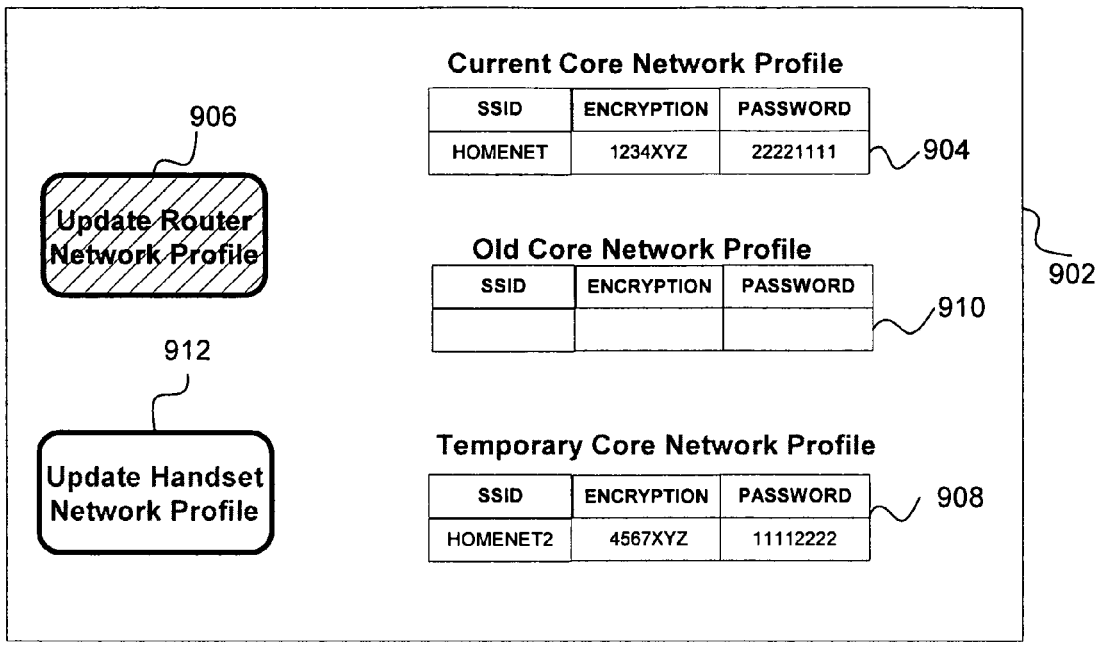
FIG. 9 illustrates an exemplary web page displayed during operation of the process of FIG. 7.
Figure 9A:
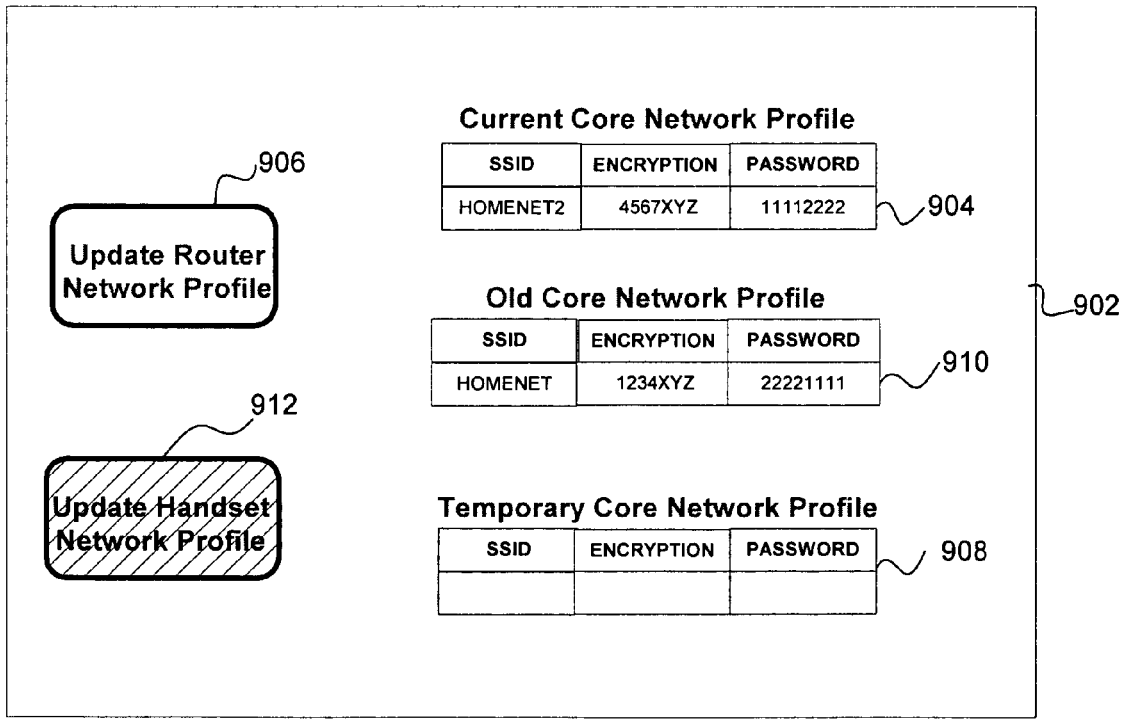
FIG. 9A illustrates the exemplary web page of FIG. 9 at a later stage of the process of FIG. 7.

FIG. 9 illustrates an exemplary Web page 902, configured according to one embodiment of the present invention. Web page 902 can be a web page stored in a server chip of AP (router) 805, for example. Current core network profile table 904 illustrates current core network profile information used by router 805. Update Router tab 906 is provided that allows a user to store new network profile settings after highlighting the former. A user can enter new network profile information in temporary profile 908. After highlighting Update Router tab 906, the information in temporary profile 908 is loaded and stored in current core network profile table 904, as illustrated in FIG. 9A. The former settings displayed in current core network profile table 904 of FIG. 9 are then stored in old core network profile table 910. The data contained in old core network profile table 910 corresponds to network profile information still employed by WiFi terminal 806 to associate with AP 804. For example, referring also to FIG. 5, information in old core network profile table 910 corresponds to three columns of information contained in network communications profile 506. Before updating with new communications profile information, memory 808 of terminal 806 contains the information now residing in the old core network profile of FIG. 9A. This old core network profile is used to wirelessly communicate with WiFi terminal 806 using AP 804 and to send updated communications profile information. As illustrated in FIG. 9A, temporary network profile table 908 is emptied after the new core network profile is stored in current core network profile table 904.

Tab 912 is provided to allow the user to send updated core network profile settings wirelessly to WiFi terminal 806. When tab 912 is selected, AP 804 selects the updated core network profile information in current core network profile table 904 to send to WiFi terminal 806. AP 804 then uses the network profile settings stored in old network profile table 910 to communicate the updated profile information to WiFi terminal 806.

In step 710, the WiFi terminal receiving the updated network profile information is reset. In the resetting operation, the updated network profile information is stored in a network profile of the WiFi device that is used to communicate with the AP in question.

In another embodiment of the present invention, network profile updates are sent directly to a WiFi terminal from a computer using a hardwire connection. Thus, in step 706, a link to the WiFi terminal is established by plugging a connection from the terminal into a computer, for example a USB connection. Preferably, the IP address of the WiFi terminal is known so that a web page of the WiFi terminal can be accessed to enter the updated network profile information already stored in the AP device.

Figure 10:
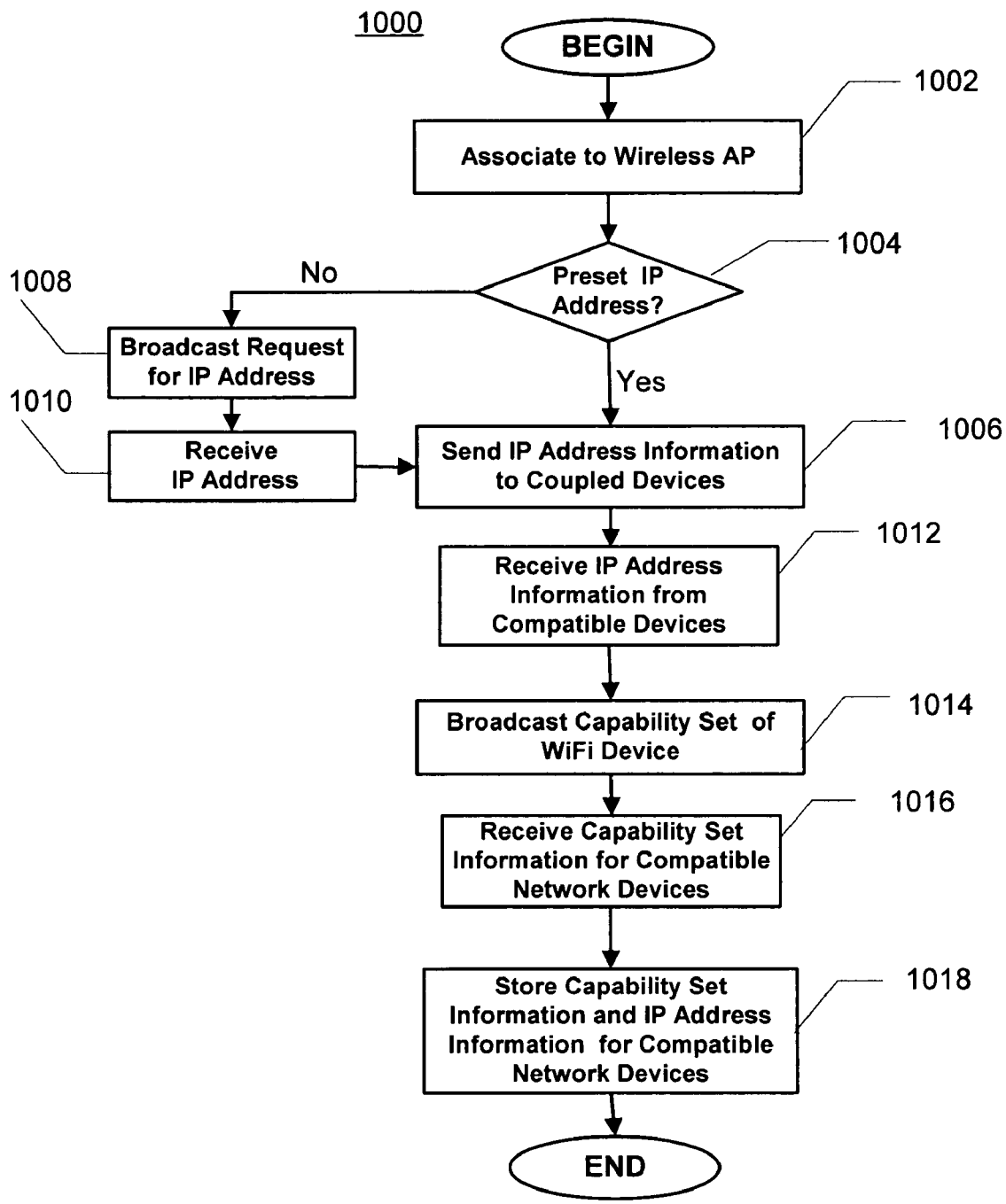
FIG. 10 illustrates exemplary steps involved in a method for enhancing communications in a wireless network, according to another embodiment of the present invention.

FIG. 10 illustrates exemplary steps involved in a method 1000 for enhancing communications in a wireless network, according to another embodiment of the present invention. Because WiFi terminals operate using communications protocols such as 802.11, each terminal is generally provided with an IP address that allows the terminal to receive data from a data network using IP protocol at the given IP address. To facilitate exchange of data, such as voice over internet data (VOIP) packets, JPEG, video, or sound clips, between terminals connected to a wireless network, exchange of IP address information that identifies a WiFi terminal, as well as capabilities of a given terminal is useful. In the exemplary steps illustrated in FIG. 10, association of a WiFi terminal with a wireless AP is followed by exchange of IP and capability information between the WiFi terminal and devices connected to the wireless network.

In one embodiment of the present invention, in step 1002, a WiFi handset completes association with a wireless AP of the wireless network. This step may take place automatically or be facilitated by a WiFi terminal user. For example, step 1002 may comprise substeps 400-416 illustrated in FIG. 4. After associating with a wireless AP, the WiFi terminal is able to exchange information with other devices in the wireless network.

Figure 11:
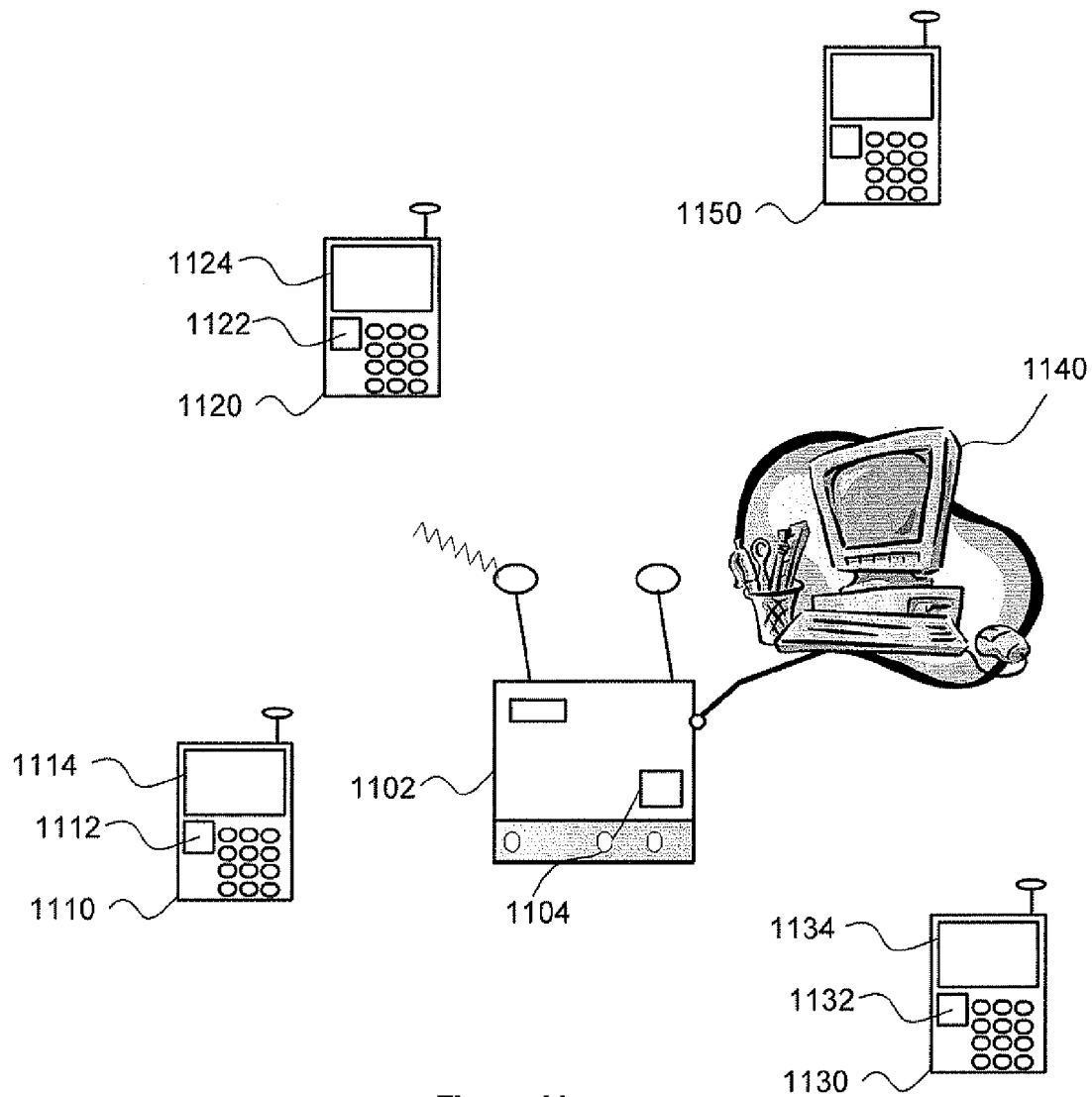
FIG. 11 illustrates an exemplary wireless network in accordance with one embodiment of the present invention.

FIG. 11 illustrates an exemplary wireless network 1100 in accordance with one embodiment of the present invention. Wireless AP 1102 is hardwire connected to terminal 1140 over a data network. Terminal 1140 can be, for example, a personal computer type device. WiFi terminals 1110, 1120, and 1130 are configured to communicate over a wireless link with wireless AP 1102. For purposes of illustration of the exemplary process steps of FIG. 10, it will be assumed that WiFi terminals 1110 and 1120 are provided with respective IP addresses that are known to each other and that WiFi terminal 1130 is a device that is being added to the network. In addition, WiFi terminals 1110 and 1120 can contain the same core network communications profile as that of WiFi terminal 1130 and AP 1102, which can be profile 904, for example.

In the exemplary process of FIG. 10, after the WiFi handset is associated with the wireless AP, the process moves to step 1004 where a determination is made as to whether the WiFi terminal has a preset IP address. For example, referring also to FIG. 11, if the WiFi terminal has a preset IP address, the process moves to step 1006. Thus, for example, if WiFi terminal 1130 contains a preset IP address, the preset address information will be sent to other devices, as illustrated in step 1006.

If the WiFi terminal does not have a preset IP address, the process moves to step 1008. In step 1008, the WiFi terminal broadcasts a request message to obtain an IP address. Because the WiFi terminal is associated with the wireless AP, the message is received at the AP and forwarded to a server, such as a DHCP server. The DHCP server, which can reside in the wireless AP, is responsible for assigning IP addresses for devices linked to the wireless network. Thus, in the case of newly added WiFi terminal 1130, a message is broadcast to wireless AP 1102, requesting that an IP address be assigned and forwarded to WiFi terminal 1130. In one embodiment of the present invention illustrated in FIG. 11, wireless AP 1102 contains DHCP server 1104, which is used to generate an IP address in response to a request received from WiFi terminal 1130. The IP address is then forwarded in a radio message from wireless AP 1102 to WiFi terminal 1130.

In step 1010, the WiFi terminal receives an assigned IP address in a broadcast message from the wireless AP.

In step 1006, once an IP address is determined for the WiFi terminal, the IP address is announced to devices that are coupled to wireless AP. Thus, the IP address of WiFi terminal 1130 can be sent to coupled devices 1110, 1120, and 1140. The term "coupled" as used herein, refers to a device that is linked to a wireless AP of the wireless network either through a wireless link, a hardwire link of a data network, or a combination of the two, such that the IP address of the coupled device is known to devices of the wireless network, such as the wireless AP, other coupled devices, and a central server, if any.

In one embodiment of the present invention, step 1006 is performed by the WiFi terminal broadcasting its IP address in a proprietary message. The proprietary message is received by the wireless AP and sent to other devices. The proprietary message format can be such that only compatible devices that are coupled to the wireless network can fully understand the content of the message. Thus, referring again to FIG. 11, WiFi terminal 1130 can broadcast an IP alerting message that contains the IP assigned to WiFi terminal 1130. The message is meant to inform other devices in network 1100 as to the existence of WiFi terminal 1130 and its address. When wireless AP 1102 receives the message it is forwarded to devices 1120, 1110, 1140, and 1150. Devices 1120, 1110, and 1140 are part of network 1100 and share the same proprietary technology. However, device 1150 is not part of the network and does not share the same proprietary technology. For example, device 1150 may be another WiFi handset made by a different vendor than that of the devices of network 1100, and not meant to be part of network 1100. When AP 1102 sends the proprietary IP alerting message received from WiFi terminal 1130 to WiFi devices 1110 and 1120, device 1150 also receives the message. Devices 1110 and 1120 interpret the message to mean that new WiFi terminal 1130 is announcing its presence as a network device and is sending its IP address. However, although device 1150 is equipped to receive the radio broadcast from wireless AP 1102, it cannot decode the message and therefore ignores the message. Accordingly, only devices 1110, 1120, and 1140 (which receives the IP alerting message over a wireless link) acknowledge and understand the message.

In an alternative embodiment of the present invention, in step 1006, a user of the WiFi terminal manually enters the WiFi terminal IP address into a device of the wireless network. For example, after determining its IP address, the WiFi device can display this information to a user, who then enters this is a device of the wireless network. Referring to FIG. 11, for example, the user can enter the IP address information displayed by WiFi terminal 1130 into computer 1140. Computer 1140 then forwards the information through wireless AP 1102 to other network devices such as devices 1110 and 1120.

In step 1012, the WiFi terminal receives IP address information from compatible devices of the wireless network. After receiving and decoding a proprietary message from the WiFi terminal, every other compatible device acknowledges the message and sends an acknowledgment message to the newly added WiFi terminal. The acknowledgment message is preferably in proprietary form and includes the IP address of the acknowledging device. For example, devices 1100, 1120, and 1140 all send acknowledgements to WiFi terminal 1130 that include their individual IP addresses.

Once the IP address information from compatible devices is received, the WiFi terminal can store the IP address information so that communications with any of the compatible devices is facilitated. Thus, after step 1012, the WiFi terminal and compatible devices form part of a wireless network, where each device is aware of other devices in the network and IP addresses associated with each device. Thus, exchange of information between any compatible devices is facilitated. For example, in FIG. 11, devices 1110, 1120, 1130, and 1140 all may maintain a list of IP addresses of other compatible network devices. Alternatively, a master device (not shown), such as a server, could maintain a copy of compatible device information such as the IP address for each compatible device. In this case, a permanent record of the WiFi terminal IP address information that is sent in step 1006 may be stored in the master device and accessed by any compatible devices. Thus, for example, an IP address announcement sent by WiFi terminal 1130 may be received at the master device (not shown) and stored. Compatible wireless network devices 1110, 1120, and 1140 may be alerted to the presence of a WiFi terminal 1130, but the IP address of WiFi terminal need not be stored locally in the compatible devices.

Similarly, in step 1012, rather than individual devices sending IP address information, the master server may send WiFi terminal 1130 all the IP address information of compatible devices 1110, 1120, and 1140. WiFi terminal is accordingly alerted to the presence and (IP) location of other compatible devices of wireless network 1100. However, the IP address information corresponding to devices 1110, 1120 and 1140 need not be stored in WiFi terminal 1130.

In step 1014, the WiFi device broadcasts a message that includes the capability set information of the WiFi device. As used herein, the term "capability set" refers to a set of services and applications that are supported by the device having the capability set. The services may include, for example, picture exchange, sound clip exchange, and so forth. The applications may include phonebooks, word processing programs, etc. In addition, components of the capability set such as services can be further divided into service variants. For example, a picture exchange service could include service variants such as picture exchange of bitmaps, picture exchange of JPEG, picture exchange in a single direction. In step 1014, the capability set message from the WiFi terminal can be forwarded to network compatible devices after being received at a wireless AP. By alerting the wireless network as to its capability set, a newly associated device can facilitate communications with other compatible devices of the wireless network. Any network compatible devices that receive the capability set message can decode the message and store the capability set information. The IP address of the WiFi terminal is sent along with the capability set information of the WiFi terminal. Thus, compatible devices can store the capability set information together with the appropriate IP address that identifies the WiFi terminal having that capability set.

In step 1016, the WiFi terminal receives capability set information from compatible devices in the wireless network. For example, referring once more to FIG. 11, WiFi device 1130 receives capability set messages from devices 1110, 1120, and 1140.

In one embodiment of the present invention, the capability set message sent in step 1014 is sent together with an IP announcement broadcast message that is sent in a variant of step 1006, as discussed above. In the latter case, compatible devices receiving the IP and capability set information can respond in kind by sending IP and capability set information of the given compatible device to the IP address of the WiFi terminal.

In step 1018, the capability set information and IP address information of compatible network devices is stored in a memory of the WiFi device, for example, memory 1132 of device 1130.

Once a given wireless device has completed the above process steps, communication with other devices in the wireless network is enhanced. For example, the WiFi device can send and receive information to other devices in the network, based on knowledge of the IP address and capabilities of the other wireless network devices.

Figure 12:
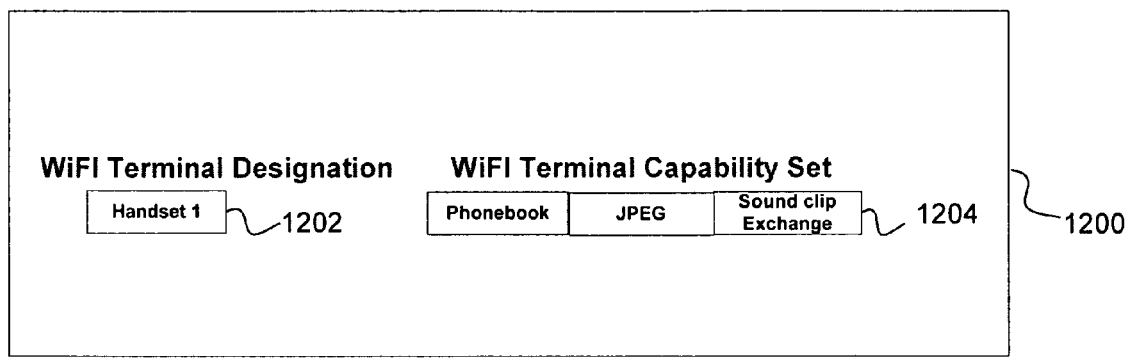
FIG. 12 illustrates an exemplary display in a WiFi terminal associated with a wireless network, in accordance with one embodiment of the present invention.

FIG. 12 illustrates an exemplary display 1200 in a WiFi terminal associated with a wireless network, in accordance with one embodiment of the present invention. For example, display 1200 could be embodied in screen 1134 of WiFi terminal device 1130. In this case field 1202 allows a user to designate a device that the user wishes to communicate with. The device designation entered in field 1202 can be, for example, a nickname of the designated device that was given to the WiFi terminal device in a proprietary exchange. The nickname corresponds to a unique device and is associated with the IP address of that device. Alternatively, if the user does not know the nickname, but does know the IP address of the designated device, the IP address information can be entered. Preferably the nickname and IP address is available from a menu, such as a scrollable menu that lists names/IP addresses of compatible devices of the wireless network. When the name or IP address of the designated device is entered, field 1204 displays capability set information, For example, field 1204 could correspond to capability set information of device 1110. In this case, the user of WiFi terminal 1130 would see that device 1110 had the capability of sound clip exchange, JPEG, and Phonebook applications. In this manner, the WiFi terminal 1130 user would realize that sound clips and JPEG could be exchanged with device 1110, and phone book information could also be successfully forwarded to device 1110.

Figure 12A:
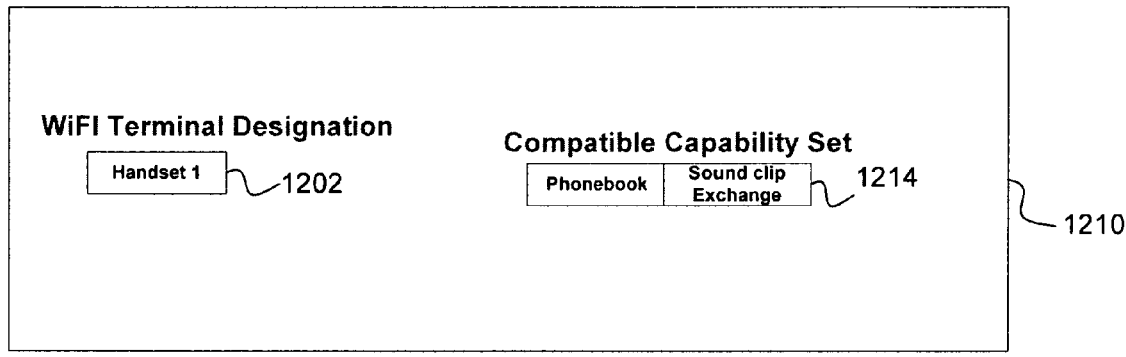
FIG. 12A illustrates another exemplary display in accordance with a further embodiment of the present invention.

FIG. 12A illustrates another exemplary display 1210 in accordance with a further embodiment of the present invention. After entering the designated compatible device name/IP address in field 1202 (in FIG. 12A, the designated device is known as "Handset 1"), a compatible capability set field 1214 is displayed. In this case, field 1214 represents capabilities shared by both WiFi device 1130 and device 1110 (Handset 1). Because WiFi terminal 1130 knows what its own capabilities are, and because it knows what the capabilities of device 1110 are, a display of those capabilities contained in both devices can be shown. For example WiFi terminal device 1130 may contain bitmap exchange, phonebook, and sound clip exchange capability, while device 1110 contains phonebook, sound clip exchange, and JPEG. Field 1214 alerts the user to the fact that phonebook and sound clip exchange capability are supported by both devices, but also shows by inference that neither JPEG or bitmap are supported by both devices and therefore should not be used in a communication between the devices.

Figure 12B:
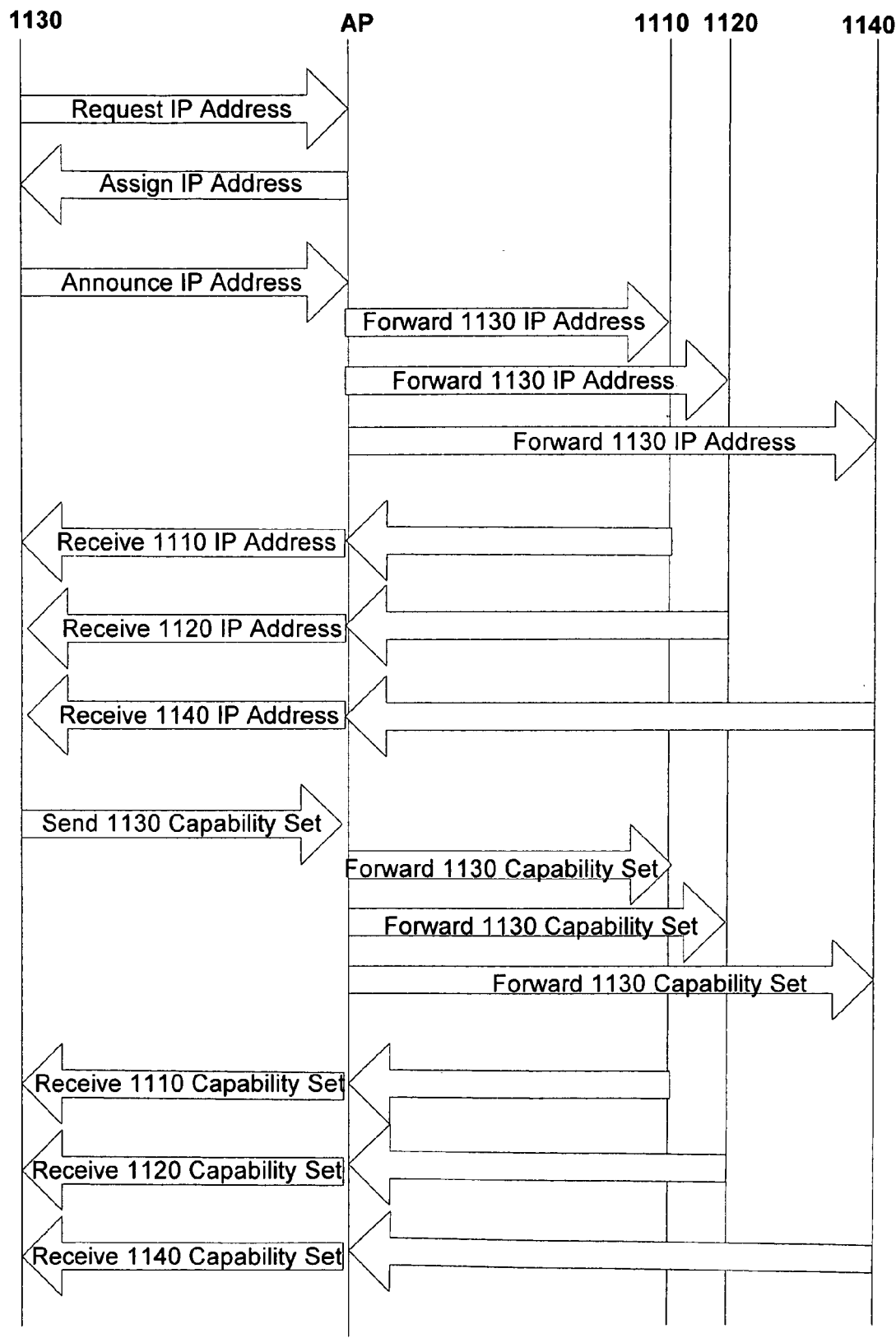
FIG. 12B illustrates a schematic of message sequences involved in the exemplary steps in FIG. 10 for automatic IP address and capability sharing between wireless devices.

In another embodiment of the present invention, a WiFi handset user can perform a capability set query in which capable devices of the wireless network can be displayed that fulfill a certain criteria. Thus, the user may query for JPEG capability, and the WiFi terminal can check the IP and capability set information stored internally, so that any devices having JPEG capability are displayed to the user on the WiFi terminal screen by IP address, for example, In one embodiment of the present invention, the exemplary steps shown in FIGS. 4 and 10 are performed automatically without any intervention by the WiFi terminal user. Thus, a communications profile may be supplied at the factory. Once the user of the WiFi terminal powers on the device in step 402, subsequent steps 404, 410-411, 413-414, 416 and 1004-1018 are performed in sequence automatically. FIG. 12B illustrates a schematic of message sequences involved in the exemplary steps in FIG. 10 for automatic IP address and capability sharing between wireless devices. Thus, a user can turn on a new WiFi terminal "out of the box" with subsequent associating with a wireless network, receiving an IP address, sending the IP address and capability set information, and receiving like kind information from compatible devices all performed automatically.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for enhancing communications in a wireless network, comprising:
    associating a WiFi terminal to a wireless access point (AP);
    determining an IP address for the WiFi terminal;
    sending IP address information that identifies the WiFi terminal to one or more devices coupled to the wireless AP;
    receiving an IP address from the one or more devices coupled to the wireless AP;
    sending a message containing a capability set of the first WiFi terminal to the one or more devices coupled to the wireless AP, wherein the capability set is a set of services and applications that are supported by the first WiFi terminal;
    receiving a message including capability set information from the one or more devices coupled to the wireless AP, wherein the capability set information comprises a respective set of services and applications that are supported by each of the one or more device;
    receiving a selection of a selected device of the one or more devices; and
    displaying at least a portion of the capability set information of the selected device on a display of the first WiFi terminal.

2. The method of claim 1, the associating the WiFi terminal comprising:
    installing a first communications profile in a memory of the WiFi terminal;
    powering on the WiFi terminal;
    automatically authenticating the WiFi terminal with the wireless AP based on information in the first communications profile;
    requesting association with the access point; and
    completing association and authentication between the WiFi terminal and the wireless AP.

3. The method of claim 1, the determining the P address of the WiFi terminal comprising:

sending a broadcast request for an IP address; and
receiving an IP address from a server linked to the wireless network.

4. The method of claim 1, the sending the IP address information comprising broadcasting IP address information that identifies the first WiFi device in a proprietary message, wherein the proprietary message is forwarded to devices coupled to the wireless AP.

5. The method of claim 1, the sending the IP address information comprising entering JP address information displayed by the WiFi device though a user interface in a device coupled to the wireless AP, wherein the JP address information is forwarded to any additional devices coupled to the wireless AP.

6. The method of claim 1, further comprising recording in memory the IP address from the one or more devices coupled to the wireless AR.

7. The method of claim 1, the one or more devices comprising one of:
WiFi devices coupled to the wireless AP; and
IF devices coupled to the wireless AP over an IP network.

8. The method of claim 1, further comprising:
receiving a selection of a service or application to be employed in the communications session.

9. The method of claim 1, wherein the displayed capability set information comprises a capability set that is supported by both the first WiFi device and the selected device.

10. The method of claim 1, wherein the displayed capability set information comprises a capability set that is supported by the selected device.

11. A system for enhanced communications between a plurality of devices linked to a wireless network, comprising:
a wireless access point (AP) configured to receive data from a data network through a wired link;
a first WiFi terminal having a first JP address and configured to communicate with the wireless AP over a wireless communications link;
one or more additional devices each having a unique IP address and each coupled to the wireless AP;
a memory comprising a plurality of respective capability sets and IP addresses characteristic of respective devices of the plurality of devices, wherein each capability set of the plurality of respective capability sets comprises a set of services and applications that are supported by a respective device of the plurality of devices; and
wherein the first WiFi terminal is configured to display on a screen a capability set field, and wherein the first WiFi terminal is configured to display in the capability set field a capability set of a second device of the plurality of devices when a selection of the first WiFi terminal receives a selection of the second device.

12. The system of claim 11, the memory residing locally in each of the plurality of devices.

13. The system of claim 11, the wireless network comprising an 802.11 communications link.

14. The system of claim 11, further comprising a DHCP server for assigning an IP address to devices linked to the wireless network.

* * * * *